United States Patent

[11] 3,572,858

| [72] | Inventor | Salvatore J. Pompei |
| | | Port Clinton, Ohio |
| [21] | Appl. No. | 848,964 |
| [22] | Filed | Aug. 11, 1969 |
| [45] | Patented | Mar. 30, 1971 |
| [73] | Assignee | General Motors Corporation |
| | | Detroit, Mich. |

[54] REMOVABLE FELT SEAL
5 Claims, 1 Drawing Fig.

[52] U.S. Cl. .................................................... 308/187.2
[51] Int. Cl. ........................................................ F16c 33/78
[50] Field of Search .......................................... 308/187.1,
187.2; 277/95, 94, 189

[56] References Cited
UNITED STATES PATENTS
2,590,422  3/1952  Large .......................... 308/187.2

Primary Examiner—Frederick L. Matteson
Assistant Examiner—Frank Susko
Attorneys—Warren E. Finken and F. J. Fodale ABSTRACT: A felt-type seal has a two-part casing with one part removably mounted on the other so that the felt element is replaceable when the seal is permanently mounted on a bearing race. The bearing itself may be relubricated when the felt element is replaced.

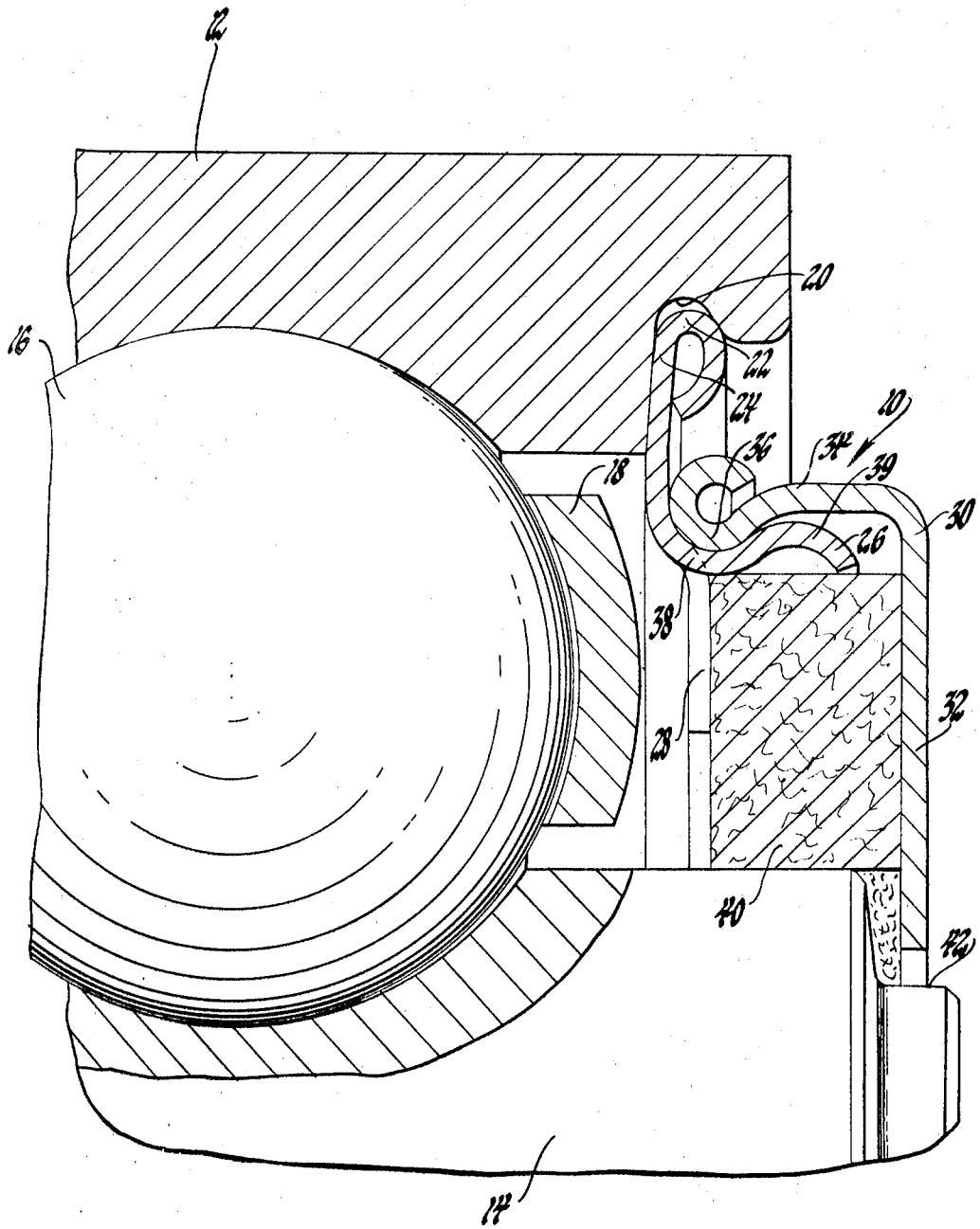

REMOVABLE FELT SEAL

My invention relates generally to bearing seals and more specifically to the type of bearing seal wherein a felt annulus slidably engages one of the races.

Felt-type seals have been used in the past, for instance, as shown in the Large U.S. Pat. No. 1,917,988. In this general type of seal, it is normally to be expected that the felt element experiences the greatest amount of wear. When seals of this type are permanently mounted on the bearing as shown in the aforementioned Large patent, the entire seal must be replaced when the felt element becomes worn. Moreover with a permanent type of mounting, it is ordinarily very difficult to remove a seal for replacement and/or relubrication of the bearing with the bearing in its environment.

Broadly the object of my invention is to provide a felt-type seal in which the felt element is replaceable. Another object of my invention is to provide such a seal in which the felt element can be replaced and the bearing relubricated while in its environment. This I have generally accomplished by providing a two-part casing for the felt element with one part of the casing being snap-retained and removable from the other part which is permanently secured to the bearing.

With these and other objects in view, as will hereinafter more fully appear, and which will be more particularly pointed out in the appended claims, reference is now made to the following description taken in connection with the accompanying drawings in which the FIGURE is a fragmentary view partially in cross section of a ball bearing equipped with a seal in accordance with my invention.

More specifically in reference to the drawings, the seal indicated generally at 10 is used to close off one end of the annular chamber between the outer race 12 and the inner race 14 in which is disposed a complement of balls 16 spaced by a cage 18. The outer race 12 includes a mounting groove 20 which receives the outer bent over rim 22 of a sheet metal shell 24. The particular manner in which the rim 22 is swagged into the mounting groove 20 is immaterial to my invention except insofar as the shell 24 is permanently and nonrotatably secured to the outer race 12. For a complete description of a suitable method of swagging the outer rim of a shell into a bearing mounting groove, reference may be made to the aforementioned Large U.S. Pat. No. 1,917,988.

The shell 24 which forms one part of a two-part casing of the seal 10 has its inner margin cut on radial lines. From this inner margin, a set of circumferentially spaced fingers 26 are bent out in the axial direction into a gentle curve which resembles somewhat of an S lying on its side. The margin portions between the fingers 26 continue generally radially inwardly forming a second set of fingers 28.

The other part of the two-piece casing consists of a sheet metal cup 30 having a radial wall 32 and a circumferential wall 34. The open end of the circumferential wall 34 terminates in a circumferential bead 36 which is nested in a cradle portion 38 on each of the fingers 26; the cradle portion 38 being provided by the first trough of the S. The second trough 39 or reverse curve of the S provides a cam by which the bead 36 on the cup 30 cams the resilient fingers 26 radially inwardly until the bead passes over the hump to be snap-retained in the cradle 38. Disposed between the radial set of fingers 28 and the radial wall 32 of the cup 30 is a felt annulus 40 which has its inner circumference slidably engaging a land on the inner race 14.

In the particular bearing disclosed, the land on the inner race 14 extends axially beyond the outer race 12 and includes an undercut 42. The radial wall 32 of the cup 30 has a central aperture and extends radially inwardly beyond the felt annulus 40 into the undercut 42. It is to be understood that in some instances the race will not have an undercut in which case the wall 32 terminates short of the felt annulus 40. While I have referred to a felt annulus, it is to be understood as including any equivalent annulus of a fibrous or porous material. In instances where it is desirable to shunt electrical current away from the balls 16, a carbon impregnated felt or porous carbon block can be used.

With the above description, it is readily apparent that the cup 30 is removably mounted on the shell 24 and that, therefore, the felt annulus 40 is replaceable. It is also apparent that when the felt annulus 40 is replaced, the bearing may be relubricated, if desired. Thus it can be seen that I have provided a seal in which the felt element can be replaced and the bearing relubricated while in its environment.

I claim:

1. A bearing seal having a replaceable sealing annulus comprising in combination:
   a sheet metal shell having a generally radial wall;
   a first set of fingers continuous with said radial wall and extending axially therefrom;
   a retention surface on said first set of fingers;
   a second set of fingers continuous with said radial wall and continuing generally radially therefrom;
   a cup having a generally radial wall and a cylindrical wall;
   a circumferential bead on said cylindrical wall;
   said cup being removably retained on said sheet metal shell through cooperation of said bead with said retention surfaces on said first set of fingers; and
   a sealing annulus disposed between said second set of fingers and said radial wall on said cup.

2. A seal having a replaceable sealing annulus comprising in combination:
   a generally flat sheet metal shell having its outer margin adapted to be permanently secured in a mounting groove on a bearing race;
   a plurality of fingers severed from and bent out of the inner margin of said shell in a generally axial direction so as to include a cradle portion and a cam portion;
   said fingers being resilient and deflectable in the radially inward direction;
   a sheet metal cup having a cylindrical wall with a radially inwardly-directed circumferential bead adapted to engage said cam surfaces, deflect said fingers radially inwardly and be retained by said cradle portions;
   said cup being removably mounted on said plate by said bead being retained by fingers; and
   a sealing annulus disposed between said inner margin of said plate and the bottom wall of said cup.

3. The seal as defined in claim 2 wherein said fingers are S-shaped in cross section.

4. The seal as defined in claim 2 wherein said sealing annulus is electrically conductive.

5. In a bearing provided with a seal having a discrete sealing annulus wipingly engaging one of the races and disposed between two generally parallel walls of a casing secured to the other of the races, the improvement comprising:
   a two-piece casing consisting of;
   a first shell permanently secured to said other race and providing one of said generally parallel walls; and
   a second shell removably mounted on said first shell and providing the other of said generally parallel walls whereby said discrete sealing annulus is replaceable when said first shell is permanently secured to said other race.